United States Patent Office 3,463,714
Patented Aug. 26, 1969

3,463,714
ELECTRODEPOSITION OF POLYMERS IN
NON-AQUEOUS MEDIA
William D. Suomi, Gary, Ind., and Abraham Ravve, Chicago, Ill., assignors to Continental Can Company, Inc., New York, N.Y., a corporation of New York
No Drawing. Filed June 30, 1967, Ser. No. 650,221
Int. Cl. C23b 13/00; B01k 5/02
U.S. Cl. 204—181                                7 Claims

ABSTRACT OF THE DISCLOSURE

A process for electrodepositing polymeric coatings by applying an electrical potential across electrodes immersed in an electrocoating bath which is prepared by dissolving a carboxyl-containing polymer and a basic nitrogen-containing compound in a suitable solvent and adding a sufficient amount of a polar organic non-solvent having a solubility parameter greater than 12 and a hydrogen bond index greater than 7.5 to convert the polymer solution into a suspension, the article to be coated serving as one electrode of the electrical circuit used to deposit the polymer.

BACKGROUND OF THE INVENTION

Field of invention

This invention relates to coating articles and in particular to coating electrically-conducting surface areas of articles by electrodeposition of organic film-forming materials from non-aqueous media.

The prior art

Can bodies and ends therefor have the interior surfaces thereof coated with lacquer when the cans are intended to contain beverages or varieties of food products. A thin coating of lacquer is usually applied to the interior metal surface of the can by a roller coating process before it is shaped to form the can. During the shaping operation, the lacquer is usually scratched or otherwise subjected to minor damage which exposes small areas of the metal, thus rendering the cans liable to corrosion by the contents thereof. The damage effected to the lacquer during can shaping is generally repaired by spraying the interior of each can with a further coating of lacquer. This process is extremely wasteful of lacquer because not only is the lacquer sprayed onto the damaged areas, but it is also sprayed on those areas which are undamaged and which consequently do not require further coating.

In addition to spraying, coating of metal surfaces as well as repair coating of coated metal surfaces can be effected by electrodeposition from aqueous dispersions of a suitable polymeric coating material. In this coating process, the metal article to be coated is immersed in an electrocoating bath which generally consists of particles of the polymeric coating material suspended in an aqueous electrolytic solution. The conducting surface of the article to be coated serves as one electrode of the electrocoating bath. When a potential of the required polarity is applied between the article to be coated and a second electrode which completes the electrical circuit dipped into the aqueous suspension, the particles of the coating material are deposited on the article in the form of a uniform layer.

To date, electrically-deposited coatings have not proven entirely satisfactory for commercial practice. When aqueous dispersions are used as a suspending medium for the coating material, electro-gassing results at the electrode due to the electrolytic hydrolysis of water. The generation of gas bubbles at the coating surface results in pin-hole faults in the electrodeposited coating. Such pinholing has long plagued the electrocoating industry.

Non-aqueous suspensions and solutions of polymeric materials in organic solvents have been employed as electrocoating baths. For example, Feinlieb, Trans-Electro. Chem. Soc. 88, 11–21 (1945) deals with the deposition of vinyl polymers from organic suspensions. Gemant, J. Phys. Chem. 43, 743 (1939) used organic suspensions of polystyrene, methacrylate polymers and mixed alkyl and urea formaldehyde resins. Although the work of Feinlieb and Gemant was successful, the coatings produced were less of a satisfactory quality than is required in commercial practice.

SUMMARY OF THE INVENTION

Now according to the present invention, it has been found that a polymeric coating of improved quality can be electrodeposited rapidly and conveniently on the exposed surfaces of a metal article by contacting the article with an electrocoating bath prepared by dissolving a carboxyl-containing polymer and a basic nitrogen-containing compound in an organic solvent and adding a sufficient amount of a polar organic non-solvent having a solubility parameter greater than 12 and a hydrogen bond index greater than 7.5 to convert the solution into a suspension, the article upon which the polymeric material is to be deposited serving as an electrode of the bath.

As the electrocoating bath of the present invention is essentially non-aqueous, no gaseous products are given off at the electrodes and therefore, gassing is of no serious concern.

Further, in practicing the process of the present invention to repair pre-coated can bodies, the carboxyl-containing polymer is deposited only on those areas of the can body in which the pre-coating of lacquer may have been damaged. Due to the insulating properties of the pre-coating, no polymer is electrodeposited on the adequately pre-coated areas of the body which results in a substantial economy in the cost of repair coating. Also, as will hereinafter be illustrated, when compared with electrocoating processes previously employed in the art, can coatings repaired by the process of the present invention are of substantially superior quality.

PREFERRED EMBODIMENTS

Suitable carboxyl-containing polymers which may be employed in the process of the present invention are polymers of $\alpha,\beta$-ethylenically unsaturated carboxylic acids and copolymers thereof with vinyl monomers.

Typical examples of $\alpha,\beta$-ethylenically unsaturated carboxylic acids include acrylic acid, methacrylic acid, maleic acid, fumaric acid, maleic anhydride, crotonic acid, citraconic acid and its anhydride, itaconic acid and its anhydride, chloromaleic acid and the like.

Vinyl monomers which may be copolymerized with the $\alpha,\beta$-ethylenically unsaturated carboxylic acid to prepare the carboxyl-containing polymers used in the electrocoating baths of the present invention include ethylene, propylene, styrene, isobutene, vinyl chloride, vinylidene chloride, chloroprene, vinyl acetate, vinyl acetal, methyl and ethyl acrylate, methyl and ethyl methacrylate and mixtures thereof.

Illustrative examples of polymers and copolymers which may be prepared from the above-mentioned $\alpha,\beta$-ethylenically unsaturated carboxylic acids and vinyl monomer include polyacrylic acid, polymethacrylic acid, vinyl acetate/acrylic acid copolymers, vinyl acetate/maleic acid copolymers, vinyl chloride/vinyl acetate/maleic acid copolymers, vinyl chloride/vinyl acetate/acrylic acid copolymers, styrene/ethylhexylacrylate/acrylic acid copolymers, ethylene/acrylic acid copolymers, ethylene/methacrylic acid copolymers, ethylene/itaconic acid copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methacrylic acid/vinyl acetate copolymers, ethylene/propylene/acrylic acid copolymers, ethylene/styrene/acrylic acid copolymers, ethylene/vinyl chloride/acrylic acid copolymers, ethylene/vinylidene chloride/acrylic acid copolymers, ethylene/vinyl fluoride/methacrylic acid copolymers, polyethylene/acrylic acid graft copolymers, polyethylene/methacrylic acid graft copolymers, polymerized ethylene/propylene acrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, and polyethylene/acrylic acid/ethyl acrylate graft copolymers.

The amount of the $\alpha,\beta$-ethylenically unsaturated carboxylic acid which may be copolymerized with the vinyl monomer may vary from about 0.1 to about 30.0% of the polymer composition and for most purposes, a resin containing from about 0.1 to about 10.0% of combined carboxylic acid is sufficient. Dibasic acids, such as maleic acid, are usually effective in smaller amounts than monobasic acids. When vinyl esters are present in the copolymer compositions, in addition to such monomers as vinyl halides and carboxylic acids, their amount may vary from about 1 to about 50 percent by weight of the copolymer.

Suitable solvents include ketones, such as methyl ethyl ketones, methyl isobutyl ketone, isophorone; amides such as dimethyl formamide, dimethyl acetamide; nitriles such as acetonitrile, propionitrile; ethers such as tetrahydrofuran; esters such as ethyl acetate, butyl acetate, isopropyl acetate, and surfur-containing compounds such as dimethyl sulfoxide and the like.

In preparing the electrocoating bath of the present invention, the carboxyl-containing polymers are dissolved in the solvent at a concentration in the range of about 1 to about 30 percent by weight based on the total weight of the bath. For repair coating of pre-coated can bodies, an amount of carboxyl-containing polymer in the electrocoating bath in the range of about 1 to about 5 percent by weight is sufficient.

The basic nitrogen-containing compound is added to the polymer solution at an equivalent weight ratio of basic nitrogen-containing compound to carboxyl-containing polymer of at least 1:10, a ratio in the range of 3:10 to 1:1 being preferred.

Examples of basic nitrogen-containing compounds include hydrazine, alkyl amines such as methyl amine, ethyl amine, diethyl amine, ethanol amine, heterocyclic amines such as piperidine, morpholine, N-methyl morpholine, polyamines such as melamine and triazine and polymers thereof such as melamine-formaldehyde resins and triazine-formaldehyde resins. When included in the polymer suspension, the basic nitrogen containing compound activates the carboxyl-containing polymer into the charged state.

To the solution containing the carboxyl polymer and basic nitrogen compound is added a sufficient amount of the polar organic non-solvent to turn the solution cloudy to form a suspension of the polymer. Generally, about 10 to about 35 percent by weight of the non-solvent is sufficient to form the suspension.

To be effective, the polar organic non-solvent liquid must have a solubility parameter greater than 12 and a hydrogen bond index greater than 7.5. Solubility parameter is defined as the square of the cohesive energy density. The term is more fully discussed in Hildebrand, J. H., and Scott, R. L., The Solubility of Non-Electrolytes, Third Edition, Reinhold, New York, 1950. Hydrogen Bonding Index is more fully discussed in Burell, H., Offic. Dig. Feder. Soc. Paint Technol., 27, 726–758 (1955) and Burrell, H., Offic. Dig. Feder. Soc. Paint Technol., 29, 1069–1076 (1957).

Solvents which have a solubility parameter of 12 or more and a hydrogen bonding index of 7.5 or more include benzyl alcohol, methyl and ethyl alcohol, diethylene glycol, methyl acetamide, ethyl acetamide, formamide, ethyl formamide, glycerol and phenol.

To effect deposition of the carboxyl-containing polymer coating material from the electrocoating bath, an electrical current is caused to flow between the body to be coated and a suitable electrode immersed in the electrocoating bath by establishing a DC potential between the body and the electrode and permitting the electrical current to flow until the electrically conducting surface areas of the body have been coated with carboxyl-containing polymer deposited from the bath.

In the repair coating of the interior lacquer coating of cans, the electrocoating bath material is poured in the can and the can body is made the anode of the electrical current.

The electrical potential applied in the process of the present invention is controlled below the value at which dielectric breakdown of the deposited coating occurs and may range from between 20 volts to 2,000 volts per inch of electrode spacing. The current density to be selected for the electrodeposition varies and generally will depend upon such parameters as the selected voltage, the desired thickness of the coating, the conductivity of the electrocoating bath, and the time allotted for the formation of a coating. Generally, the electrodeposition processing voltage is preferably varied from 100 to 2,000 volts per inch of electrode spacing to produce a conventional coating weight within a reasonable time, e.g., 2 to 3 seconds.

After the carboxyl-containing polymer is coated on the article surface, the article is separated from the bath and baked at an elevated temperature, e.g., 160° to 175° C. for 5 to 10 minutes to remove all volatile material, such as the solvent and the polar non-solvent, from the coated article.

Small amounts, e.g., from 0.005% to 10% of the total bath weight of materials which impart desirable properties to the electrodeposited coating but which do not interfere with the electrocoating process, such as pigments, fillers, plasticizers, anti-oxidants, corrosion inhibitors, and the like may also be included in the electrocoating bath.

To illustrate the manner in which the present invention may be carried out, the following examples are given. It is to be understood, however, that the examples are for the purpose of illustration, and the invention is not to be regarded as limited to any of the specific materials or conditions recited therein.

Example I

An electrocoating bath was prepared by dissolving in 72 grams of butyl acetate, 3 grams of a vinyl resin terpolymer consisting of 86% by weight vinyl chloride, 13% by weight vinyl acetate, and 1% by weight maleic anhydride present as maleic acid, designated Polymer I, the polymer having an average molecular weight of 26,000 and a carboxyl equivalent weight of 6,200 and 1 gram of N-methylmorpholine. Methanol was then added slowly to the solution with stirring until a very cloudy suspension formed. A total amount of 24 grams of methanol was added to the solution. No precipitation of the vinyl resin was noted over a 24-hour interval.

The foregoing electrocoating bath was placed in a tinplate can, the interior of which was coated with an epoxyamine lacquer and a steel electrode was placed in the can in a position so that all the points on the electrode surface were ¾ inch to ½ inch from the nearest point on the inside of the can.

A current having a potential difference of 440 volts was applied across the electrode and the can for periods ranging from 1 to 3 seconds, the can being the anode. After the application of the current, the can was inverted to remove the bath liquid and the inverted can was baked for 5 minutes at 175° C. in a forced air oven.

A series of similar pre-coated cans were repair coated following the above procedure using different polymer concentrations.

In addition to Polymer I, a copolymer of vinyl chloride and butyl maleate containing free carboxyl groups equivalent to not less than 0.2% monobutyl maleate available commercially under the trade name Exon 470 designated as Polymer II was also employed as a repair coating material.

The quality of the repair-coated can coatings was evaluated by a conductivity test. In this test, the treated can is filled with a 1.0% solution of NaCl and the conductivity of the solution is measured when a standard potential is applied between the can body and a steel electrode immersed in the center of the solution. An untreated pre-coated can had a conductivity reading of 75 milliamperes using this test.

The results of these tests are summarized in the table below.

TABLE

| Test No. | Vinyl resin in bath | Vinyl resin concentration (wt. percent) | Time (sec.) | Conductivity (milliamperes) |
|---|---|---|---|---|
| 1 | I | 2.5 | 3 | Less than 5. |
| 2 | I | 2.7 | 3 | Do. |
| 3 | I | 2.8 | 3 | Do. |
| 4 | I [1] | 2.8 | 3 | Less than 7. |
| 5 | I [2] | 3.9 | 1 | Less than 1. |
| 6 | II | 2.9 | 3 | Do. |

[1] Ethyl acetate used as solvent.
[2] Isopropyl acetate used as solvent.

By way of contrast, a similar can, repair coated following the procedure of Example I with the exception that the electrocoating bath was a solution of Polymer I and N-methyl morpholine which had not been converted to a suspension with methanol had a conductivity of more than 25 milliamperes.

By way of further contrast, a similar can repair coated following the procedure of Example I with the exception that an equivalent amount of a vinyl chloride/vinyl acetate/vinyl alcohol copolymer containing 91% by weight vinyl chloride, 3% by weight vinyl acetate, and 6% by weight vinyl alcohol, having no free carboxyl groups, was substituted for the vinyl resin used in Example I and had a conductivity reading of 17 to 20 milliamperes.

By way of still further contrast, a similar can repair coated following the procedure of Example I with the exception that an equivalent amount of a vinyl chloride/vinyl acetate copolymer consisting of 87% by weight vinyl chloride and 13 percent by weight vinyl acetate having no free carboxyl groups was substituted for the vinyl resin used in Example I, and had a conductivity of 14 to 15 milliamperes.

Example II

The procedure of Example I was repeated with the exception that an equivalent amount of a triazine-formaldehyde resin having a molecular weight of about 700, commercially available under the trade name MX-61, was substituted for N-methyl morpholine in the electrocoating bath. The repaired can coating had a conductivity of 3 milliamperes.

Results similar to the foregoing may also be obtained when any other carboxyl-containing polymer is substituted for the vinyl chloride/vinyl acetate/maleic acid terpolymer of Example II and any other basic nitrogen-containing compound is substituted for the triazine-formaldehyde resin of Example II in an electrocoating bath.

What is claimed is:

1. A method of applying a coating to the electrically conducting surface of an article comprising the steps of:
   (a) preparing an electrocoating bath by dissolving a carboxyl-containing polymer and a basic nitrogen-containing compound in an organic solvent and adding a sufficient amount of a polar organic non-solvent having a solubility parameter greater than 12 and a hydrogen bonding index greater than 7.5 to convert the solution into a suspension;
   (b) causing the surface of the article to contact the suspension, said article serving as a first electrode;
   (c) causing a second electrode to contact said suspension;
   (d) causing a direct electric current to flow between said first and said second electrodes and through said suspension at an electrical potential; and
   (e) permitting the electrical current to flow until the electrically conducting surface of the article has been coated with the carboxyl-containing polymer.

2. The method of claim 1 wherein the carboxyl-containing polymer is a vinyl resin formed by the copolymerization of at least one vinyl compound with an $\alpha,\beta$-ethylenically unsaturated carboxylic acid.

3. The method of claim 1 wherein the carboxyl containing polymer is a vinyl resin which contains from about 0.2 to about 20 percent by weight based on the resin of an $\alpha,\beta$-ethylenically unsaturated carboxylic acid.

4. The method of claim 3 wherein the $\alpha,\beta$-ethylenically unsaturated carboxylic acid is maleic acid.

5. The method of claim 1 wherein the basic nitrogen containing compound is N-methyl morpholine.

6. The method of claim 1 wherein the basic nitrogen containing compound is a triazine-formaldehyde resin.

7. The method of claim 1 wherein the polar organic non-solvent is methanol.

References Cited

UNITED STATES PATENTS

| 2,345,543 | 3/1944 | Wohnsiedler et al. | 204—181 |
| 2,462,125 | 2/1949 | Oakes | 204—181 |
| 2,800,446 | 7/1957 | Fredenburgh | 204—181 |
| 2,898,279 | 8/1959 | Metcalfe et al. | 204—181 |
| 2,947,677 | 8/1960 | Blickwedel | 204—181 |

OTHER REFERENCES

Gemant, "Electrodeposition of Synthetic Resins," in Industrial and Engineering Chemistry, vol. 31, October 1939, pp. 1233–1236.

Shyne, "Electrophoretic Application of Organic Finishes," in Organic Finishing, May 1956, pp. 12–14.

JOHN H. MACK, Primary Examiner

E. ZAGARELLA, Jr., Assistant Examiner